US012039825B2

(12) United States Patent
Dawson, III

(10) Patent No.: US 12,039,825 B2
(45) **Date of Patent: *Jul. 16, 2024**

(54) CLICK AND LOCK BUTTON DECK FOR ELECTRONIC GAMING DEVICE

(71) Applicant: Aristocrat Technologies, Inc., Las Vegas, NV (US)

(72) Inventor: John Dawson, III, Spring Hill, TN (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/079,730

(22) Filed: Dec. 12, 2022

(65) Prior Publication Data

US 2023/0113803 A1 Apr. 13, 2023

Related U.S. Application Data

(63) Continuation of application No. 17/202,105, filed on Mar. 15, 2021, now Pat. No. 11,551,505.

(60) Provisional application No. 63/065,184, filed on Aug. 13, 2020.

(51) Int. Cl.
*G07F 17/32* (2006.01)

(52) U.S. Cl.
CPC ...... *G07F 17/3209* (2013.01); *G07F 17/3211* (2013.01); *G07F 17/3216* (2013.01)

(58) Field of Classification Search
None
See application file for complete search history.

(56) References Cited

U.S. PATENT DOCUMENTS

| | | | | |
|---|---|---|---|---|
| 7,955,176 | B2 * | 6/2011 | Tastad | G07F 17/3216 312/334.44 |
| 7,976,393 | B2 | 7/2011 | Haga | |
| 8,012,027 | B2 | 9/2011 | McGahn | |
| 8,366,555 | B2 | 2/2013 | McGahn | |
| 8,574,082 | B2 | 11/2013 | Haga | |
| 10,854,039 | B2 | 12/2020 | Lamb | |
| 2010/0279771 | A1 | 11/2010 | Block | |

(Continued)

OTHER PUBLICATIONS

Office Action (Notice of Allowance and Fees Due (PTOL-85)) dated Sep. 9, 2022 for U.S. Appl. No. 17/202,105 (pp. 1-10).

*Primary Examiner* — Sunit Pandya
(74) *Attorney, Agent, or Firm* — Brownstein Hyatt Farber Schreck, LLP

(57) ABSTRACT

A gaming device may include a main cabinet that defines an opening for receiving a button deck. The button deck may include a button deck enclosure and one or more buttons protruding from or otherwise defined along a button surface of the button deck enclosure. A coupling tab may include a signal connector operable to connect to a signal connector of the button deck to electrically couple the button deck to a game controller of the gaming device. The gaming device may further include a locking pin locator operable to receive a locking pin to mechanically (e.g., physically) couple the button deck to the main cabinet of the gaming device. The coupling tab may be pivotally or flexibly connected to the main cabinet such that when the signal connectors are connected, the button deck moves into the opening and the locking pin is inserted into the locking pin locator.

20 Claims, 8 Drawing Sheets

(56) References Cited

U.S. PATENT DOCUMENTS

| | | | | |
|---|---|---|---|---|
| 2019/0096161 | A1 | 3/2019 | Barbour | |
| 2020/0090462 | A1* | 3/2020 | Tillery | A63F 13/90 |

* cited by examiner

CLICK AND LOCK BUTTON DECK FOR ELECTRONIC GAMING DEVICE

CROSS-REFERENCE TO RELATED APPLICATION

This application is a continuation of U.S. patent application Ser. No. 17/202,105, filed Mar. 15, 2021, which is a nonprovisional of, and claims the benefit under 35 U.S.C. § 119 (e) of, U.S. Provisional Application No. 63/065,184, filed Aug. 13, 2020, the contents of which are incorporated herein by reference as if fully disclosed herein.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

The embodiments described herein may include a gaming device that includes a main cabinet that defines an opening for receiving a button deck. The button deck may include a button deck enclosure and one or more buttons protruding from or otherwise defined along a button surface of the button deck enclosure. A coupling tab may include a signal connector operable to connect to a signal connector of the button deck to electrically couple the button deck to a game controller of the gaming device. The gaming device may further include a locking pin locator operable to receive a locking pin to mechanically (e.g., physically) couple the button deck to the main cabinet of the gaming device. The coupling tab may be pivotally or flexibly connected to the main cabinet such that when the signal connectors are connected, the button deck moves into the opening and the locking pin is inserted into the locking pin locator.

DETAILED DESCRIPTION

The embodiments herein describe a button deck for a gaming device that may be removably installed in the gaming device (e.g., capable of being repeatedly installed in and removed from one or more gaming devices). The button deck and/or the gaming device may include features that facilitate easy and quick installation and removal of the button deck, as well as electrical connections between the input elements (buttons, switches, joysticks, or the like) and internal circuitry, logic, processing elements, or the like within the gaming device. The button deck may include one or more locking pins, alignment pins, and/or signal connectors that are configured to be inserted into one or more locking pin locators, alignment recesses, and/or signal connector recesses of the gaming device. The gaming device may include a coupling tab that is pivotally or flexibly connected to a main cabinet. A signal connector of the button deck may be connected to a signal connector of the coupling tab and/or alignment pins of the button deck may be inserted into alignment recesses defined in the coupling tab. The button deck may subsequently pivot with the coupling tab to insert a locking pin into a locking pin locator to mechanically couple the button deck to the main cabinet.

Figure 1:
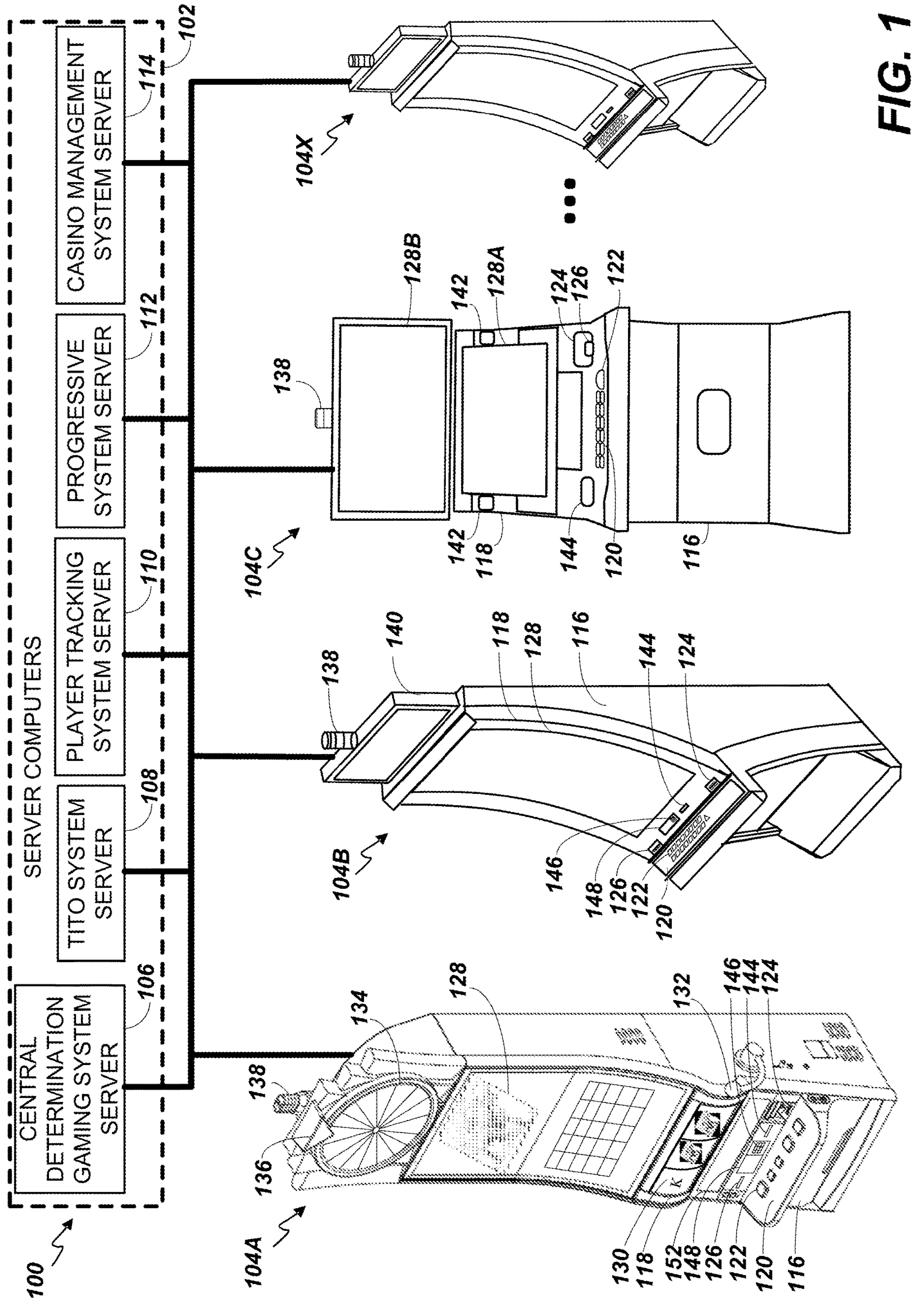
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a “ticket-in” reader that allows the player to use a casino issued credit ticket to load credits onto the gaming device 104A (e.g., in a cashless ticket (“TITO”) system). In such cashless implementations, the gaming device 104A may also include a “ticket-out” printer 126 for outputting a credit ticket when a “cash out” button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
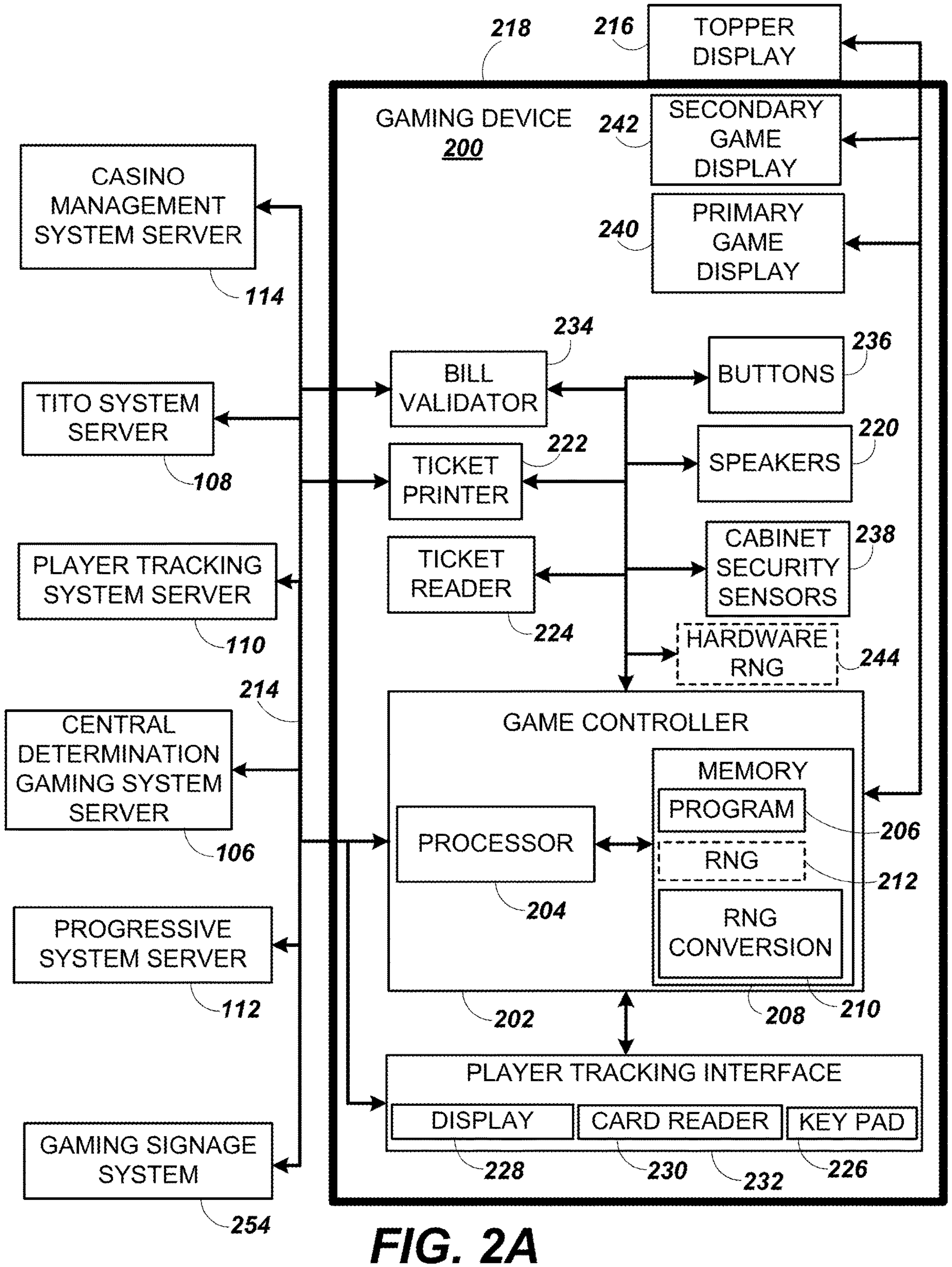
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
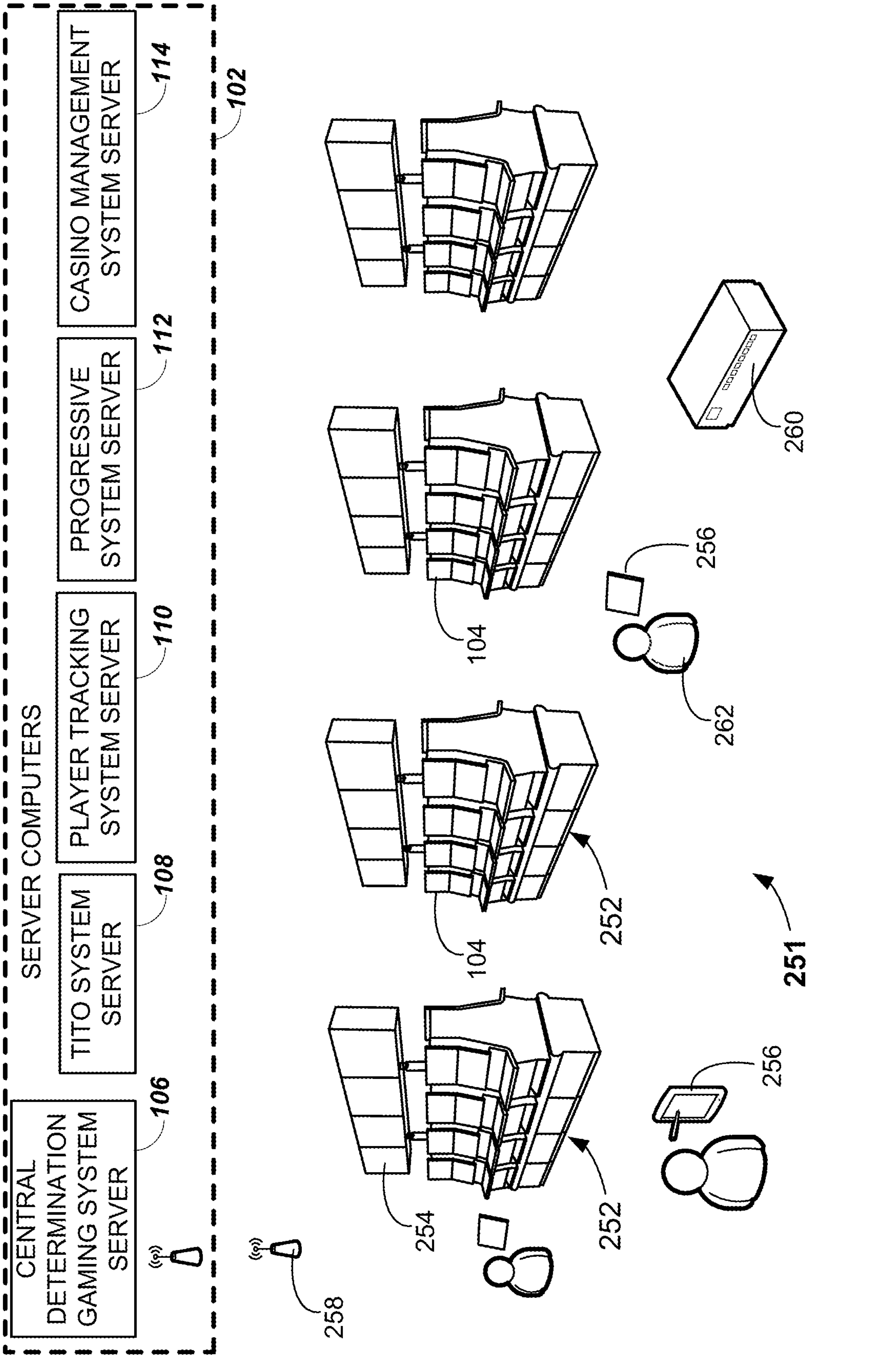
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
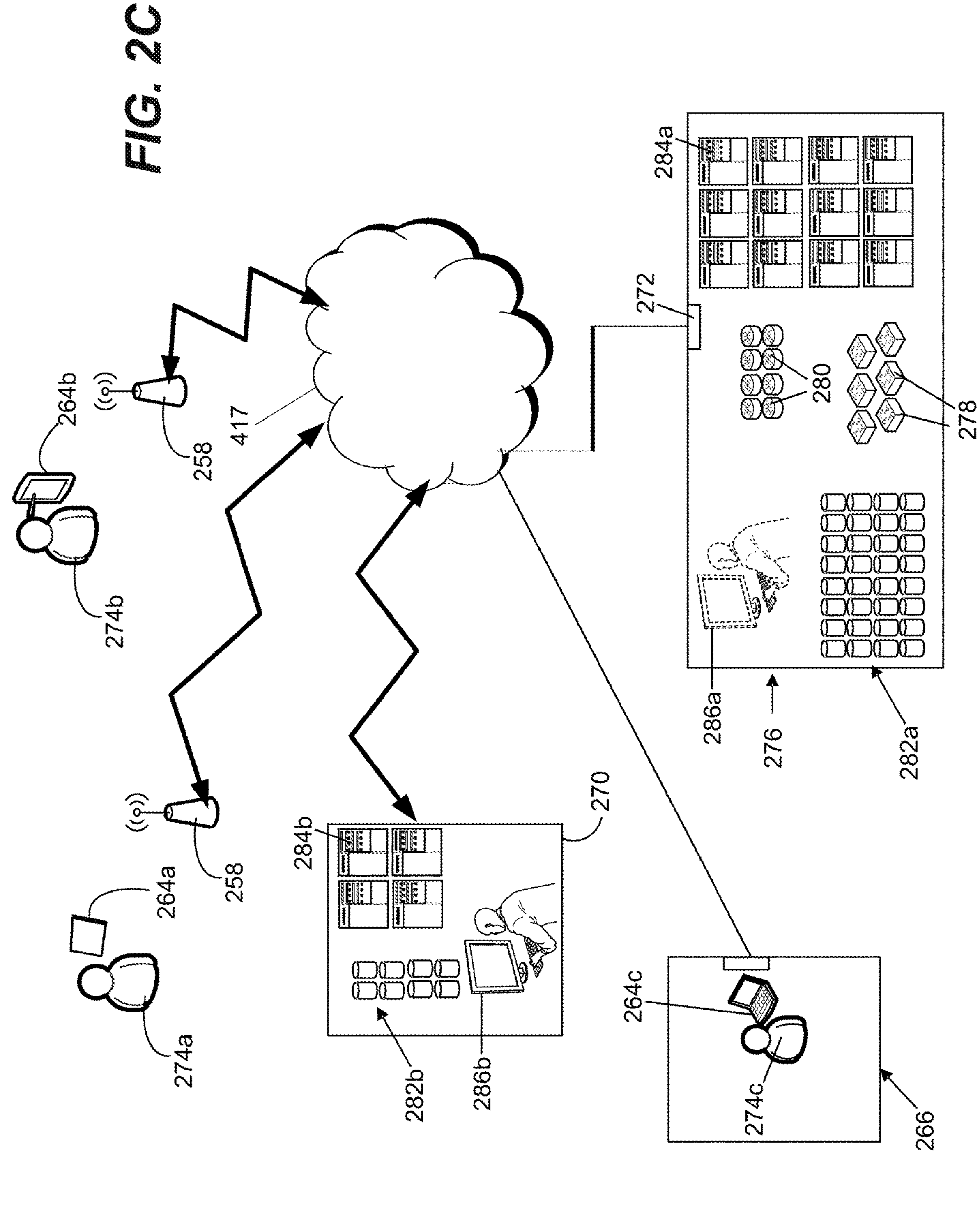
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server(s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3A:
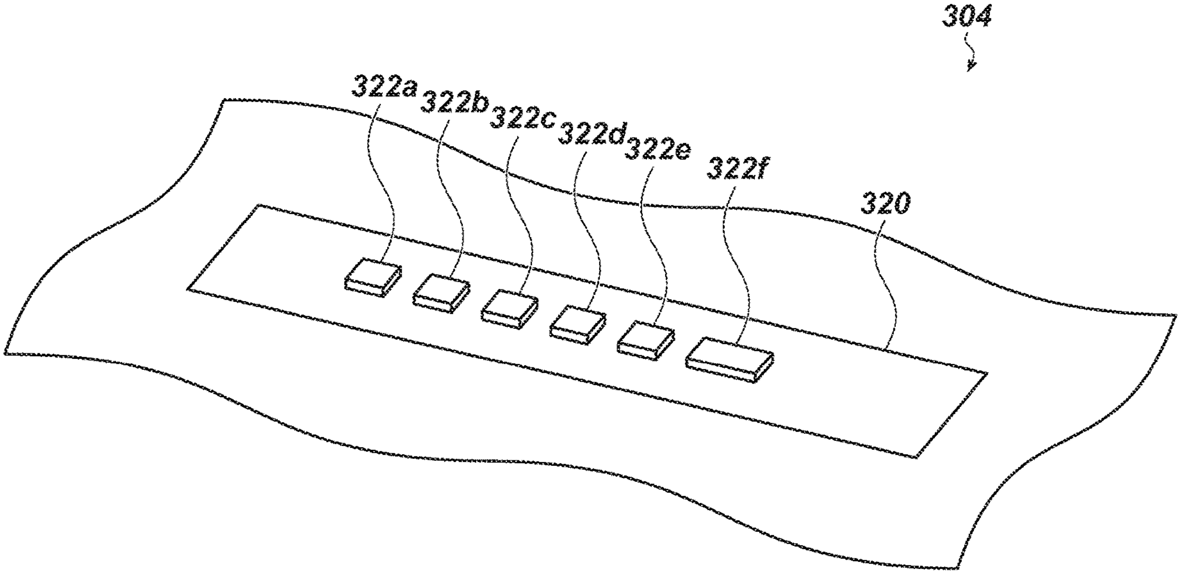
FIG. 3A illustrates an example button deck installed in a gaming device.

FIG. 3A illustrates an example button deck 320 installed in a gaming device 304, similar to the button deck 120 illustrated in FIG. 1. The gaming device 304, a portion of which is shown in FIG. 3A, may be similar to the gaming devices discussed herein (e.g., gaming devices 104*a*, 104*b*, and 104*c*). The button deck 320 may be installed in a main cabinet 316 or another component of the gaming device 304.

As noted above, the button deck 320 may be removably installed in the gaming device 304 (e.g., capable of being repeatedly installed in and removed from one or more gaming devices). The button deck 320 and/or the gaming device 304 may include features that facilitate easy and quick installation and removal of the button deck, as described herein. In various embodiments, many different button decks 320 may be installed in the gaming device 304. The button decks may be interchangeable such that different button decks may be installed for different games presented by the gaming device 304. The configuration of the button deck 320 may facilitate rapidly changing the button deck, for example to match an update to, or change in, a game executed by the gaming device. The button deck may be hot-swappable in certain embodiments (e.g., the button deck may be removed, added, and/or replaced without powering down the gaming device 304).

Similar to the other main cabinets described herein, the main cabinet 316, a portion of which is shown in FIGS. 3A-3D, may house one or more components of the gaming device 304, including, but not limited to, a game controller. The main cabinet 316 may at least partially define an exterior surface of the gaming device 304. When installed, an exterior surface 304*a* of the button deck (e.g., an exterior surface defined by a button deck enclosure of the button deck) may be flush with the exterior surface 316*a* defined by the main cabinet.

The button deck 320 may include one or more buttons 322*a-f* for receiving inputs to the gaming device 304. The buttons 322*a-f* may be mechanical buttons that depress to register an input. Additionally or alternatively, the buttons 322*a-f* may detect inputs using capacitive sensing, strain sensing, thermoelectric sensing, resistive sensing, optical sensing, or the like. In some cases, one or more buttons 322*a-f* may include a display for providing outputs. The outputs provided by the display may correspond to a function of the button. The display(s) may be configured as touch- or force-sensitive displays for providing inputs. In some cases, the button deck 320 includes one or more touch- and/or force-sensitive displays, and the buttons 322*a-f* are virtual buttons provided on the display(s). The display(s) can be implemented with any suitable technology, including, but not limited to liquid crystal display (LCD) technology, light emitting diode (LED) technology, organic light-emitting display (OLED) technology, organic electroluminescence (OEL) technology, or another type of display technology. In addition to, or instead of, any or all of the buttons 322*a-f*, the button deck 320 may incorporate a different input element, such as a joystick, trackball, touchpad, switch, or the like. Accordingly, discussions herein with respect to buttons are intended to encompass other suitable input elements, including the foregoing ones.

The button deck enclosure 340 may enclose additional components of the button deck 320, including electrical connectors, processing unit(s), and/or other circuitry. In some cases, the button deck 320 may include one or more output devices for providing outputs to users. Outputs may include audio outputs (e.g., sounds), haptic outputs (e.g., vibrations), and/or visual outputs (e.g., graphical outputs or light outputs). In some cases, the button deck 320 includes one or more haptic output devices (e.g., a haptic actuator), audio output devices (e.g., a speaker) and/or visual output devices (e.g., a display) for providing outputs. In some cases, the buttons 322*a-f* may provide haptic, audio, and/or visual outputs to a user.

The button deck 320 may additionally or alternatively include various internal components not shown in FIGS. 3A-3D, including a processing unit, communication components, memory, audio output devices (e.g., speakers), visual output devices (e.g., lights) and the like.

Figure 3B:
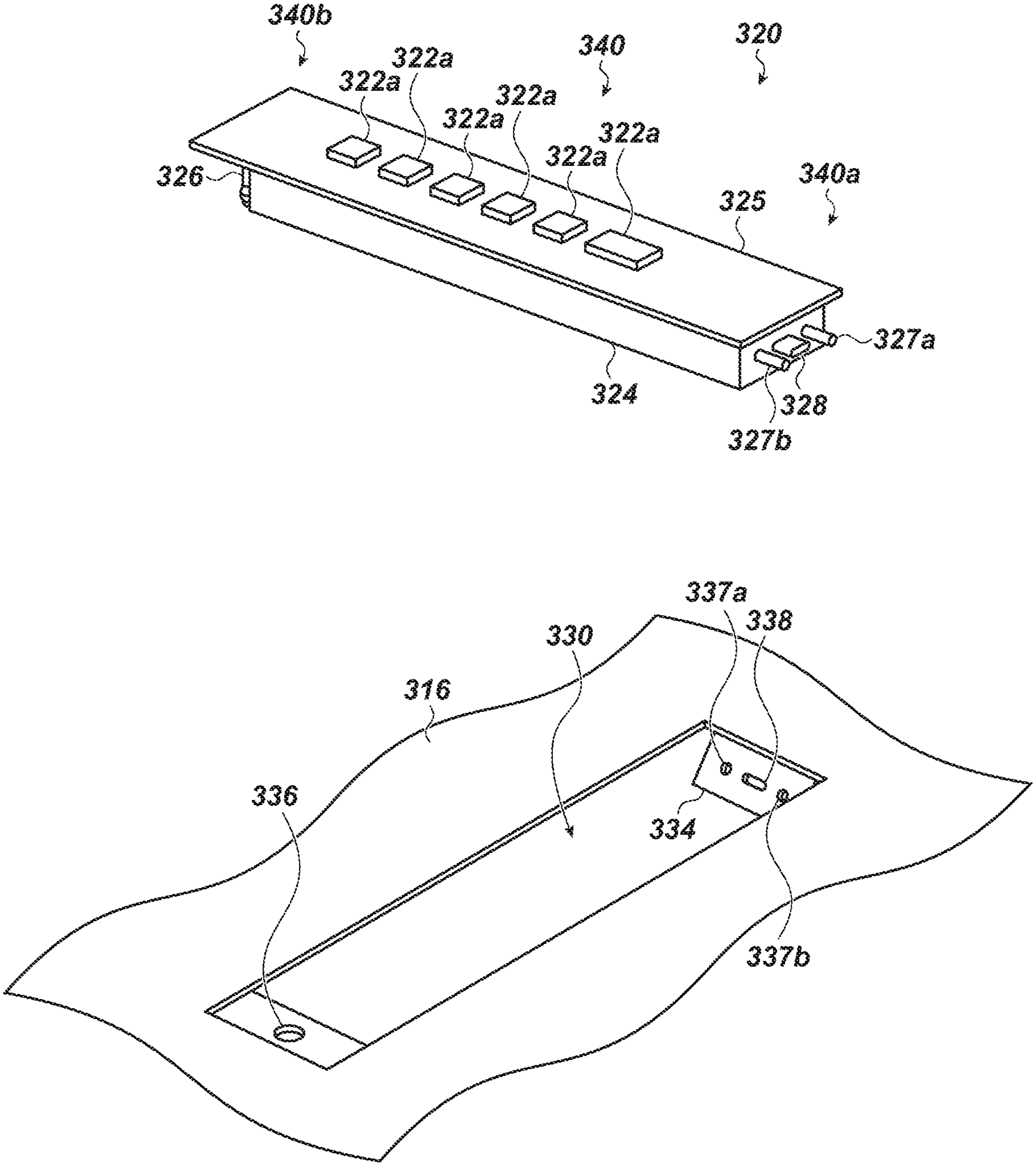
FIG. 3B illustrates the example button deck of FIG. 3A removed from the gaming device.

FIG. 3B illustrates the example button deck 320 removed from the gaming device 304 and rotated 90 degrees with respect thereto for clarity of illustration. When installed, the button deck 320 may be positioned in an opening 330 defined in the main cabinet 316.

In some cases, the button deck 320 may include a button deck enclosure 340 that encloses some or all of the components of the button deck 320. The button deck enclosure 340 may include a body section 324 that at least partially surrounds one or more internal components of the button deck. In some cases, the button deck enclosure 340 may include a button plate 325 that defines a button surface of the button deck enclosure. The button surface may be a surface of the button deck enclosure 340 that faces outward with respect to the gaming device 304 when the button deck 320 is installed in the gaming device 304. The button plate 325 may overhang one or more edges of the body section 324. The buttons 322*a-f* may be proud of or otherwise be positioned along the button surface of the button deck enclosure 340. The buttons 322*a-f* may protrude from openings in the button deck enclosure 340 (e.g., holes in the body section 324 and/or the button plate 325).

The button deck 320 may include one or more signal connectors (e.g., signal connector 328) that each connect to a respective signal connector of the gaming device 304 to electrically couple components of the button deck 320 (e.g., buttons 322*a-f*) to a game controller and/or other circuitry of the gaming device. The signal connectors 328, 338 may carry input signals from one or more input devices (e.g., the buttons 322*a-f*) of the button deck 320 to the game controller and/or other circuitry of the gaming device 304. Additionally or alternatively, the signal connectors 328, 338 may carry control signals from the game controller and/or other circuitry of the gaming device 304 to one or more output devices of the button deck 320. Additionally or alternatively, the signal connectors 328, 338 may carry power signals (e.g., alternating current (AC) signals or direct current (DC) signals) from the gaming device 304 to the button deck 320 to power the components of the button deck 320. In some cases, the same pair of signal connectors 328, 338 carries input signals, control signals, and/or power signals. In some cases, different pairs of signal connectors 328, 338 carry input signals, control signals, and/or power signals.

Each signal connector 328 of the button deck 320 may be one of a pair of mating connectors, such that the gaming device 304 includes a corresponding signal connector (e.g., signal connector 338). As shown in FIG. 3B, the signal connector 328 may be a male connector (e.g., a plug) that defines a protrusion, and the corresponding signal connector 338 may be a female connector (e.g., a socket) that defines a recess for receiving the protrusion defined by the male connector. In other cases, the signal connector 328 may be a female connector and the signal connector 338 may be a male connector. In some cases, the signal connectors 328, 338 are USB-C connectors. For example, the signal connector 328 may be a male USB-C connector and the signal connector 338 may be a female USB-C connector, or vice versa. In various embodiments, the signal connectors 328, 338 may utilize any standard or proprietary connector types, including USB, network cable, HDMI, DVI, RCA, SCSI, board mount, audio, coaxial, cable, and the like. In various embodiments, the signal connectors 328, 338 may not be a male-female pair, and may be or include two-way connectors, electrical contacts, wireless transceivers, and the like.

The signal connector 328 may connect to the signal connector 338 when the button deck 320 is installed in the gaming machine 304; FIG. 3A shows the button deck 320 so installed. Returning to FIG. 3B, the signal connector 338 may be at least partially positioned within or otherwise accessible via the opening 330. The signal connectors 328, 338 may allow the button deck 320 to be quickly and removably operably coupled to the gaming device 304. In some cases, the connection between the signal connectors 328, 338 may help to mechanically couple the button deck 320 to the gaming device 304.

As noted above, the signal connectors 328, 338 may be or include wireless transceivers for facilitating wireless data and/or power transfer between the gaming device 304 and the button deck 320. In some cases, the button deck 320 may communicate with a game controller of the gaming device 304 via a wireless network (e.g., cellular, Wi-Fi, Bluetooth, and IR). In some cases, the button deck 320 may be inductively charged or powered; it may include one or more inductive coils for receiving power from one or more inductive coils of the gaming device 304. In some embodiments, input and/or control signals may be transmitted between these inductive coils in addition to (or instead of) power transmission, thereby obviating any separate wireless communication elements.

The button deck 320 may include one or more coupling mechanisms for mechanically coupling the button deck 320 to the main cabinet 316. The button deck 320 may include one or more alignment pins 327*a*, 327*b* for facilitating alignment of the signal connectors 328, 338; these alignment pins may also reduce mechanical strain that would otherwise be exerted on the signal connectors 328, 338. In some cases, the signal connector 338 may be located in or otherwise connected to a coupling tab 334, which is positioned in or otherwise accessible through the opening 330. As noted above, the signal connector 328 may define a protrusion and the signal connector 338 may define a recess, and connecting the signal connectors 328, 338 may include inserting the protrusion into the recess.

The alignment pins 327*a*, 327*b* may be positioned on opposite sides of the signal connector 328 and may be configured to be inserted into alignment recesses 337*a*, 337*b* defined in the coupling tab 334. The signal connector 328 may define a protrusion that extends from a first end portion 340*a* of the button deck enclosure 340 in a direction that is substantially parallel to the button surface of the button deck enclosure. The alignment pins 327*a*, 327*b* may extend from a first end portion 340*a* of the button deck enclosure 340 in a direction that is substantially parallel to the button surface of the button deck enclosure.

Additionally or alternatively, the button deck 320 may include a locking pin 326 that is configured to engage a locking pin locator 336 of the main cabinet 316. The locking pin 326 may extend from a second end portion 340*b* of the button deck enclosure 340, opposite the first end portion 340*a*, in a direction that is substantially perpendicular to the button surface of the button deck enclosure. The locking pin 326 may extend away from the button surface of the button deck enclosure 340 from a portion of the button plate 325 that overhangs the body section 324.

Figure 3C:
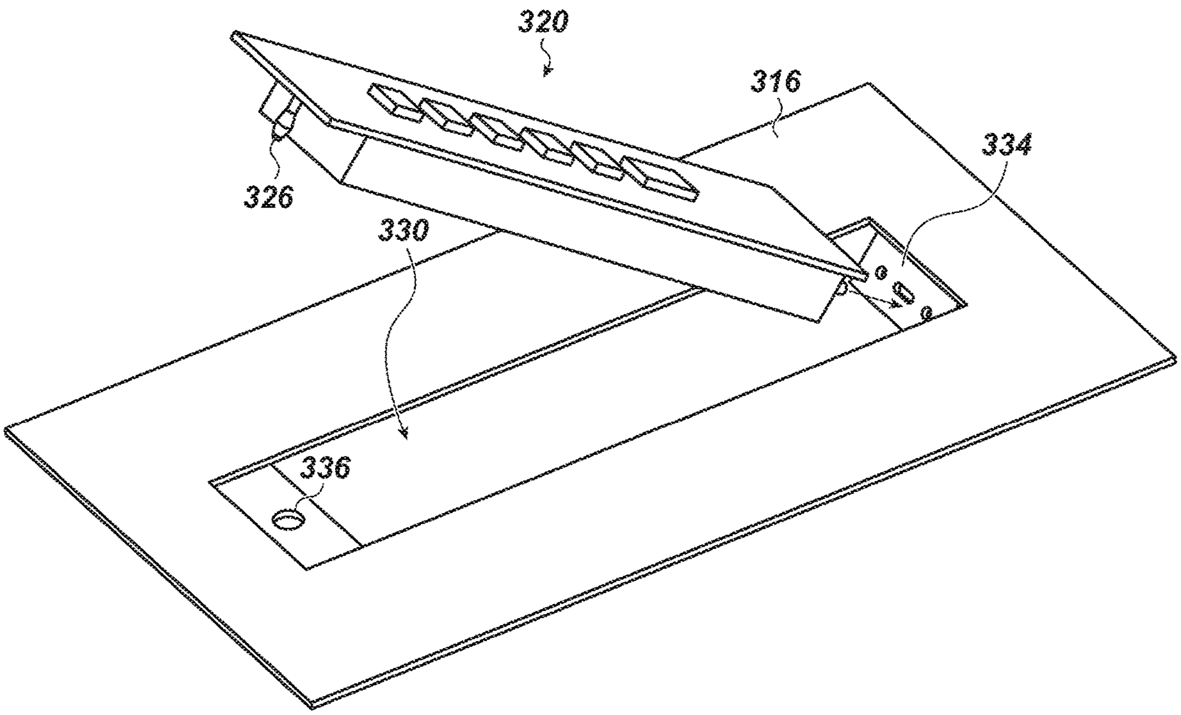
FIGS. 3C and 3D illustrate an example installation of the button deck into the gaming device.
Figure 3D:
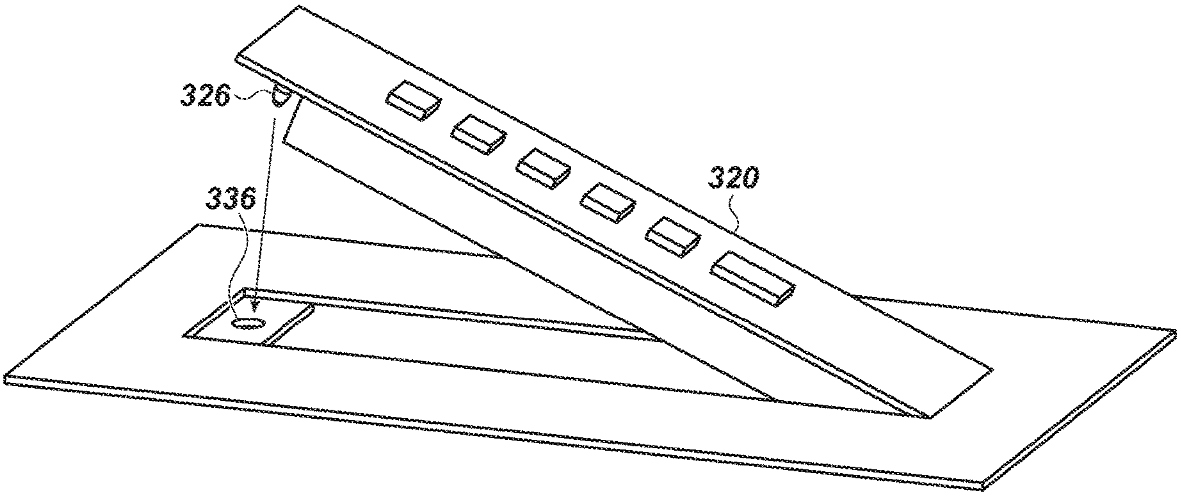

FIGS. 3C and 3D illustrate an example installation of the button deck 320 into the gaming device 304. As shown in FIG. 3C, the button deck 320 may be connected to the coupling tab 334 as part of installing the button deck 320 in the main cabinet 316. Connecting the button deck 320 to the coupling tab 334 may include connecting the signal connector 328 to the signal connector 338 and/or inserting the alignment pins 327*a*, 327*b* into the alignment recesses 337*a*, 337*b*. In some embodiments, the alignment pins 327*a*, 327*b* are inserted into the alignment recesses 337*a*, 337*b* and/or the signal connector 328 is connected to the signal connector 338 when the button deck 320 is at approximately a 45-degree angle to the cabinet 316.

The coupling tab 334 may be pivotally (e.g., hingedly) connected to the main cabinet 316. The coupling tab 334 may pivot around a pivot axis extending along a side of the opening 330. In some cases, the pivot axis may be parallel to the longest dimension of the coupling tab 334 and perpendicular to a longest dimension of the button deck 320 when the button deck 320 is connected to the coupling tab. This is not necessary and can change in some embodiments.

Once the button deck 320 is connected to the coupling tab 334, the button deck and the coupling tab may pivot about the pivot axis, allowing the button deck 320 to move towards the opening 330. In some cases, the pivoting motion may drive the signal connector 328 into the signal connector 338, which may help seat the signal connector 328 to establish a good electrical and/or mechanical connection. Similarly, the pivoting motion may drive the alignment pins 327*a*, 327*b* into the alignment recesses 337*a*, 337*b*, which may help establish a good mechanical connection between the button deck 320 and the coupling tab 334. Further, the extended moment arm of the button deck 320 may magnify a force on the signal connectors 328, 338 and/or the alignment pins 327*a*, 327*b* and alignment recesses 337*a*, 337*b*, which may enhance the likelihood of the button deck 320 seating properly and establishing a good electrical and/or mechanical connection to the gaming device 304. Alternatively, the coupling tab 334 may be flexibly or otherwise movably coupled to the main cabinet 316 such that the coupling tab and the button deck may move relative to the main cabinet to install the button deck 320 in the opening 330.

Turning to FIG. 3D, as the button deck 320 moves (e.g., pivots) toward the opening 330, the locking pin 326 approaches the locking pin locator 336, and ultimately is inserted into the locking pin locator 336. The locking pin locator 336 may retain the locking pin 326 in the locking pin locator to mechanically couple the button deck 320 to the main cabinet 316. The locking pin 326 and/or the locking pin locator 336 may include a release mechanism for removing the locking pin from the locking pin locator to remove the button deck 320 from the main cabinet 316. Once installed, the button surface of the button deck 320 may be flush with a surface of the main cabinet 316, as shown in FIG. 3A.

The locking pin locator 336 may include a latch mechanism that grasps or otherwise engages a groove or other feature of the locking pin 326 to mechanically couple the button deck 320 to the main cabinet 316. Alternatively or additionally, the locking pin 326 may include a latch mechanism that grasps or otherwise engages a groove or other feature of the locking pin locator 336 to mechanically couple the button deck 320 to the main cabinet 316. The release mechanism may be or include a cable, lever, or other element of the locking pin locator 336 and/or the locking pin 326 that causes the latch mechanism to release to disengage the locking pin 326 and the locking pin locator 336 to decouple the button deck 320 from the main cabinet 316.

The locking pin 326 and the locking pin locator 336 may form or be components of a latch or other retention mechanism, such as a pull pin latch, a cable latch, a spring-loaded latch, an electronic latch, and the like.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

What is claimed is:

1. A gaming device comprising:

a main cabinet defining an opening;

a locking pin locator;

a game controller within the main cabinet and configured to control games available for play on the gaming device; and a button deck positioned in the opening and configured to receive inputs to the gaming device, the button deck comprising:

a button deck enclosure;

a first signal connector defining a protrusion, the protrusion configured to be inserted into a recess to electrically couple to the game controller; and a locking pin, the locking pin configured to be inserted into the locking pin locator to mechanically couple the button deck to the gaming device.

2. The gaming device of claim 1, wherein the button deck is operable to be installed in the main cabinet by:

inserting the protrusion defined by the first signal connector into the recess; and inserting the locking pin into the locking pin locator.

3. The gaming device of claim 1, wherein:

the button deck enclosure comprises:

a body section; and a button plate attached to the body section; and the first signal connector extends from the body section.

4. The gaming device of claim 3, wherein:

the button plate comprises a portion that overhangs the body section; and the locking pin extends from the portion that overhangs the body section.

5. The gaming device of claim 1, further comprising a coupling tab pivotally connected to the main cabinet and comprising a second signal connector.

6. The gaming device of claim 5, wherein:

the coupling tab defines a first alignment recess and a second alignment recess; and the button deck further comprises:

a first alignment pin operable to be inserted into the first alignment recess; and a second alignment pin operable to be inserted into the second alignment recess.

7. The gaming device of claim 6, wherein:

the second signal connector is positioned between the first alignment recess and the second alignment recess; and the first signal connector is positioned between the first alignment pin and the second alignment pin.

8. A button deck for a gaming device, comprising:

a button deck enclosure;

one or more input elements operable to receive inputs;

a signal connector; and a locking pin; wherein the signal connector is operable to be inserted into a recess of the gaming device to electrically couple the one or more input elements to a game controller of the gaming device; and the locking pin is operable to be inserted into a locking pin locator to mechanically couple the button deck to the gaming device.

9. The button deck of claim 8, wherein:

the button deck comprises one or more displays; and the one or more input elements are virtual buttons presented on the one or more displays.

10. The button deck of claim 8, wherein the button deck further comprises:

a first alignment pin operable to be inserted in a first alignment recess defined in the gaming device; and a second alignment pin operable to be inserted in a second alignment recess defined in the gaming device.

11. The button deck of claim 10, wherein the signal connector is positioned between the first alignment pin and the second alignment pin.

12. The button deck of claim 8, wherein:

the button deck enclosure comprises a body section and a button plate; and the signal connector extends from the body section.

13. The button deck of claim 12, wherein:

the button plate comprises a portion that overhangs the body section; and the locking pin extends from the portion that overhangs the body section.

14. The button deck of claim 12, wherein each of the one or more input elements extends through a respective hole in the button plate.

15. A gaming device comprising:

a main cabinet defining an opening;

a locking pin locator defined in the main cabinet;

a game controller configured to control games available for play on the gaming device; and a button deck positioned in the opening and comprising:

a button deck enclosure;

an input element operable to receive an input to the gaming device;

a first signal connector extending from the button deck enclosure; and a locking pin extending from the button deck enclosure; wherein:

the first signal connector is operable to electrically couple the input element to the game controller; and when the first signal connector is connected to a second signal connector, the coupling tab and the button deck are configured to move relative to the main cabinet to cause the locking pin to be inserted into the locking pin locator, thereby mechanically coupling the button deck to the main cabinet.

16. The gaming device of claim 15, wherein:

the main cabinet defines a first exterior surface surrounding the opening;

the button deck defines a second exterior surface; and when the button deck is installed in the main cabinet, the second exterior surface of the button deck forms a contiguous surface with the first exterior surface of the main cabinet.

17. The gaming device of claim 16, wherein:

the button deck comprises one or more buttons; and each button of the one or more buttons protrudes through a respective hole in the second exterior surface.

18. The gaming device of claim 16, wherein:

the button deck comprises a display; and the input element is a virtual button provided on the display.

19. The gaming device of claim 15, further comprising a coupling tab connected to the main cabinet and comprising the first signal connector.

20. The gaming device of claim 15, wherein:

the button deck enclosure comprises a button plate; and the locking pin extends from the button plate.

* * * * *